(12) United States Patent
Schiffers et al.

(10) Patent No.: US 11,377,184 B2
(45) Date of Patent: Jul. 5, 2022

(54) CONTACTLESS POWER TRANSMISSION IN AN AZIMUTH THRUSTER

(71) Applicant: KONGSBERG MARITIME FINLAND OY, Rauma (FI)

(72) Inventors: Werner Schiffers, Leicestershire (GB); Lars Saarinen, Rauma (FI)

(73) Assignee: KONGSBERG MARITIME FINLAND OY, Rauma (FI)

( * ) Notice: Subject to any disclaimer, the term of this patent is extended or adjusted under 35 U.S.C. 154(b) by 215 days.

(21) Appl. No.: 16/075,372

(22) PCT Filed: Feb. 3, 2017

(86) PCT No.: PCT/FI2017/050060
§ 371 (c)(1),
(2) Date: Aug. 3, 2018

(87) PCT Pub. No.: WO2017/134347
PCT Pub. Date: Aug. 10, 2017

(65) Prior Publication Data
US 2019/0039705 A1 Feb. 7, 2019

(30) Foreign Application Priority Data
Feb. 4, 2016 (FI) .................................... 20165081

(51) Int. Cl.
*H02J 50/00* (2016.01)
*B63H 5/125* (2006.01)
(Continued)

(52) U.S. Cl.
CPC ............ *B63H 5/125* (2013.01); *H01F 38/18* (2013.01); *H02J 50/12* (2016.02); *H04B 5/0031* (2013.01);
(Continued)

(58) Field of Classification Search
CPC ............ H02J 50/00; H04B 5/00; B63H 5/125
(Continued)

(56) References Cited

U.S. PATENT DOCUMENTS

| 5,814,900 A | 9/1998 | Esser et al. |
| 6,012,736 A * | 1/2000 | Hansen .................. B60R 21/01 |
| | | 280/731 |

(Continued)

FOREIGN PATENT DOCUMENTS

| EP | 2 916 469 A1 | 9/2015 |
| EP | 2960147 A1 * | 12/2015 ........... H04B 1/1081 |

(Continued)

OTHER PUBLICATIONS

International Search Report and Written Opinion for Application No. PCT/FI2017/050060 dated Apr. 26, 2017, 10 pages.

(Continued)

*Primary Examiner* — Adi Amrany
(74) *Attorney, Agent, or Firm* — Alston & Bird LLP

(57) ABSTRACT

A system for contactless power transmission in an azimuth thruster, the system comprising a first body (76) comprising at least one first inductor to provide a magnetic field, a second body (78) comprising at least one second inductor to generate an electrical current from the magnetic field, the bodies being configured to be relatively rotatable, the at least one first inductor and the at least one second inductor being configured to generate an electrical current from the magnetic field at all relative rotational positions, wherein the or each of the first inductors are tuned to resonate within a predetermined frequency band and the or each of the second inductors are tuned to resonate within a predetermined frequency band, the frequency band of the or each of the second inductors at least partially overlapping with the frequency band of the or each of the first inductors.

16 Claims, 10 Drawing Sheets

(51) Int. Cl.
  *H04B 5/00* (2006.01)
  *H02J 50/12* (2016.01)
  *H01F 38/18* (2006.01)
(52) U.S. Cl.
  CPC ......... *H04B 5/0037* (2013.01); *H04B 5/0075* (2013.01); *B63H 2005/1256* (2013.01)
(58) Field of Classification Search
  USPC ........................................................ 307/104
  See application file for complete search history.

(56) References Cited

U.S. PATENT DOCUMENTS

| | | | | |
|---|---|---|---|---|
| 6,032,546 | A * | 3/2000 | Stone | G01C 19/10 307/104 |
| 6,441,511 | B1 * | 8/2002 | Masudaya | B60R 16/027 180/274 |
| 7,197,113 | B1 * | 3/2007 | Katcha | A61B 6/032 378/104 |
| 7,613,273 | B2 * | 11/2009 | Beyerlein | A61B 6/56 378/4 |
| 7,806,065 | B1 * | 10/2010 | Bekker | B63H 5/125 114/144 B |
| 9,912,254 | B2 * | 3/2018 | Delforge | A61B 6/56 |
| 2005/0226380 | A1 * | 10/2005 | Katcha | A61B 6/56 378/101 |
| 2007/0178779 | A1 * | 8/2007 | Takada | B63H 20/12 440/61 S |
| 2007/0188284 | A1 * | 8/2007 | Dobbs | H01F 27/36 336/120 |
| 2008/0095314 | A1 * | 4/2008 | Katcha | A61B 6/037 378/101 |
| 2009/0116618 | A1 * | 5/2009 | Nakayama | A61B 6/035 378/107 |
| 2009/0276199 | A1 * | 11/2009 | Krumme | H01F 38/18 703/7 |
| 2009/0304144 | A1 * | 12/2009 | Beyerlein | A61B 6/56 378/19 |
| 2010/0052941 | A1 * | 3/2010 | Madhavan | G01V 11/002 340/854.8 |
| 2010/0127892 | A1 * | 5/2010 | Wesselink | B63H 5/125 340/870.07 |
| 2010/0250035 | A1 * | 9/2010 | Ito | B63H 25/48 701/21 |
| 2011/0010028 | A1 * | 1/2011 | Mizutani | B63H 25/00 701/21 |
| 2011/0133949 | A1 | 6/2011 | Subramanian et al. | |
| 2013/0003820 | A1 * | 1/2013 | Malhan | G01L 3/10 375/238 |
| 2014/0021795 | A1 * | 1/2014 | Robertson | H02J 50/40 307/104 |
| 2014/0132210 | A1 * | 5/2014 | Partovi | B60L 53/124 320/108 |
| 2015/0288226 | A1 | 10/2015 | Niizuma | |
| 2015/0379867 | A1 * | 12/2015 | Edwards | H01P 3/122 324/639 |
| 2015/0381224 | A1 * | 12/2015 | Edwards | G01M 15/00 415/122.1 |
| 2016/0052613 | A1 * | 2/2016 | Anderson | B63H 25/42 440/6 |

FOREIGN PATENT DOCUMENTS

| | | | |
|---|---|---|---|
| EP | 3 018 668 A1 | 5/2016 | |
| EP | 3 125 434 A1 | 2/2017 | |
| GB | 2483374 A | 3/2012 | |
| JP | 2015-170936 | 9/2015 | |
| KR | 2015 0066234 A | 6/2015 | |
| WO | WO 2007/099300 A | 9/2007 | |
| WO | WO 2008/060150 A1 | 5/2008 | |
| WO | WO-2015122805 A1 * | 8/2015 | ............ B63H 21/21 |

OTHER PUBLICATIONS

Search Report for Finnish Application No. 20165081 dated Sep. 2, 2016, 3 pages.
Office Action for JP Application No. 2018-541205 dated Feb. 2, 2021 (3 pages).

* cited by examiner

CONTACTLESS POWER TRANSMISSION IN AN AZIMUTH THRUSTER

CROSS-REFERENCE TO RELATED APPLICATIONS

This application is a national phase entry of International Application No. PCT/FI2017/050060, filed Feb. 3, 2017, which claims priority to Finnish Patent Application No. 20165081, filed on Feb. 4, 2016, the entire contents of which are incorporated herein by reference.

FIELD

The present disclosure concerns apparatus for contactless transmission of power. In particular, the present disclosure concerns systems for contactless power and/or data transmission for use in applications such as marine propulsion systems.

BACKGROUND

Mechanical systems may comprise at least one part that is rotatable relative to an adjacent (stationary or rotatable) part of the mechanical system. In particular, as part of marine propulsion design, electrical signals may need to be transferred from a static structure to a rotating structure. The transfer of electrical signals between two such parts may present several challenges due to the movement of the two parts.

One such application of power transmission is in azimuth thruster design as part of a ships propulsion system, the azimuth thruster being used to propel the vessel in water. An azimuth thruster extends the position of the ship's propeller through gear boxes from a horizontal drive shaft of the ship in Z-direction to the bottom of the ship's hull. In this way, the propeller is able to rotate 360° around the vertical axis of the extended shaft and is able to provide steering, propulsion and dynamic positioning for superior manoeuvrability.

In one particular example, gearing systems operating within the thruster assembly which shift the power from the horizontal shaft to the vertical position and again to the horizontal position contain bearings which could fail during operation of the thruster and therefore need to be monitored throughout their life for early indications of wear, for example, by monitoring temperature and or vibration in the localised environment immediately surrounding the gearing system. The acquired data may then be transferred through a slip ring system from the rotating frame to the ship's hull where it might be used to ascertain the condition of the gearing system.

Previous methods have sought to transmit power from a marine vessel to such a structure by a number of varying methods. Such methods include the use of mechanical combined data and power slip rings. Such slip rings transfer raw analogue data from vibration sensors to within the marine vessel's hull. Power is transferred inside the thruster through the remaining two channels. Because thrusters of different sizes are typically offered, the slip rings often need to be adapted to the size of the thruster, which may result in added cost and complexity to existing systems, or require the design and manufacture of a bespoke system. Additionally, the use of slip rings provides a non-ideal means of power transfer as the slip rings typically wear either one or more of the shaft a and/or ring itself, leading to regular service requirements and additional cost due to any one or more of added design, manufacture or service requirements.

As such, transferring an electrical signal between a stationary part of the azimuth thruster and a rotatable part of the azimuth thruster may present several challenges. For example, it may be challenging to transfer an electrical signal via a wired connection between the stationary and rotatable parts because relative movement between the stationary and rotatable parts may cause wear on the wired connection.

Thus, there remains a need for improved transfer of electrical signals between a stationary part of the azimuth thruster and a rotatable part of the azimuth thruster.

STATEMENTS

According to various examples, there is provided a system for contactless power transmission, the system comprising a first body comprising a first inductor to provide a magnetic field, a second body comprising a second inductor to generate an electrical current from the magnetic field, the bodies being configured to be relatively rotatable, the first inductor and the second inductor configured to generate an electrical current from the magnetic field at all relative rotational positions.

Thus, in this way, the system may provide for contactless transmission of power between a first inductor and a second inductor comprised within the respective first and second bodies. Thus, the system may allow the bodies to be arranged relative to one another such that transmission of power may be maintained at all times during rotation of the first body relative to second body. Accordingly, the system may provide for increasingly robust and efficient transfer of power between the first and second bodies.

Additionally, the body arrangement may allow improved use of space due to reduced module footprint such that wider bodies and hence larger first inductors and second inductors may be used, resulting in increased quantities of power transferred. Additionally, more robust first inductors and second inductors may lead to increased reliability and increased service intervals. Additionally, the body arrangement may provide increased ease of maintenance.

Thus, the system may be used to power any one or more of a sensor, processor or wireless information transfer system. The system may thus negate the use of a battery or temporary storage of power within a closed cell system due to power transmission being maintained at all times.

The removal of a battery, or a temporary means of power storage from within a closed electro-mechanical cell such as an azimuth thruster, may provide several advantages. Accordingly, system complexity and manufacturing cost may be reduced, along with the removal of consumable items from with the system. Accordingly, there may be the potential for prolonged maintenance intervals due to limited charge/discharge capability and reduced servicing costs. Additionally, the removal of a temporary means of power storage from within the harsh operating conditions of an azimuth thruster may be considered beneficial due to concerns over damage of or leakage of materials comprised within, for example, a battery. Accordingly, the use of a battery is not practical for such applications.

Accordingly, the inductive or resonant nature of the system may allow for an increased spacing between the bodies, along with greater efficiency and improved reliability of power transmission. The system may also allow for an increasingly efficient and weight saving design due to the lack of a magnetic core, as required in non-resonant systems.

In particular, the resonant system may ensure that each of the first inductor and the second inductor are capacitively loaded to form a tuned LC circuit. If the primary and secondary coils are resonant at a common frequency, power may be transmitted between the oscillators over a range of several times the coil diameter.

Optionally, the first body may be arranged within an upper housing.

Thus, in this way, the first body may be additionally protected from environmental attack, whilst enabling increased maintainability, reduced cost and reduced manufacturing complexity. Additionally, the arrangement of a first body within an upper housing may lead to added power transfer due to the potential for increased surface area for transmitting power.

Optionally, the second body may be arranged within a lower housing.

Thus, in this way, the second body may be additionally protected from environmental attack, whilst enabling increased maintainability, reduced cost and reduced manufacturing complexity. Additionally, the arrangement of a second body within a lower housing may lead to added power transfer due to the potential for increased surface area for receiving power.

Optionally, the first inductor and the second inductor may be configured to overlap by between about 25% to 100% at all relative rotational positions.

Thus, in this way, the system may provide for improved reliability and assurance of continual power transmission, the overlap of the first inductor and second inductor respectively, allowing increased spacing between the first and second bodies.

Optionally, the first inductor and the second inductor may be configured to overlap by between about 75% to 100% at all relative rotational positions.

Thus, in this way, the system may provide for improved reliability and assurance of continual power transmission, the provision of further overlap allowing increased spacing between the first and second bodies.

Optionally, the first body may comprise two or more first inductors.

Thus, in this way, two or more portions of the first body may comprise first inductors to ensure an improved power density over the entirety of the first body.

Optionally, the second body may comprise two or more second inductors.

Thus, in this way, two or more portions of the second body may comprise second inductors to ensure an improved power receiving over the entirety of the second body.

Thus, should one or more of the first inductors and second inductors fail, providing that at least one oscillator pair remains operational, power transmission may still be provided at all relative rotational positions. Additionally, due to improved electrical coupling due to increased numbers of resonator pairs, further electrical components may be supported within the system due to increased availability of power.

Optionally, the or each capacitively loaded first inductor may comprise an induction or resonant transmitter coil.

Thus, in this way, the capacitively loaded first inductor may be comprised of a resonant transmitter coil, the resonant transmitter coil offering improved reliability and resonance capability. Thus power may be more readily transmitted to the second inductor.

Optionally, the or each capacitively loaded second inductor may comprise an induction or resonant receiver coil.

Thus, in this way, the capacitively loaded second inductor may be comprised of a resonant receiver coil, the resonant receiver coil offering improved reliability and resonance capability. Thus power may be more readily received from the first inductor.

Optionally, the or each first and second coils may be configured as annular coils.

Thus, in this way, in one or more predetermined radial locations within the first body, the first body may comprise a substantially equal respective power density and power receiving capability at all relative rotational positions.

Optionally, the or each of the capacitively loaded first inductors may form a tuned LC circuit being tuned to resonate within a predetermined frequency band and the or each of the capacitively loaded second inductors may form a tuned LC circuit being tuned to resonate within a predetermined frequency band, the frequency band of the or each of the capacitively loaded second inductors at least partially overlapping with the frequency band of the or each of the capacitively loaded first inductors.

Thus, in this way, resonance of the or each first inductor will readily resonate the or each second inductor.

Optionally, each body may comprise a conductive material.

Thus, in this way, the bodies may conduct electricity to or from the respective first inductor and/or the or each second inductor, mutatis mutandis.

Optionally, each body may comprise a facing surface comprising one or more of a flat or textured surface.

Thus, in this way, the bodies may be shaped in predetermined locations or facing sections. Thus, the spacing between the bodies may be reduced in certain sections, whilst increased at others. Thus, the increased or decreased spacing may aide in equalising and/or maintaining to generate an electrical current at all relative rotational positions. Additionally or alternatively, the increased or decreased spacing may aide in equalising respective power density and power receiving capability at all relative rotational positions within the first and second bodies, mutatis mutandis.

Optionally, one of first and second bodies may be concentrically arranged relative to the other of the first and second bodies.

Thus, in this way, the system may allow the overlap and hence transmission of power to be maintained at all times during rotation of the first body relative to second body. By concentrically arranging the first body relative to second body, the first inductor and the second inductor may be configured to generate an electrical current from the magnetic field at all relative rotational positions.

Optionally, each body may comprise a ring.

Thus, in this way, the ring shape of both the first and second bodies may allow for a substantially constant degree of overlap of the bodies at all relative rotational positions. Thus, the degree of power transmission between the first and second bodies may be continuous and at least substantially constant.

Optionally, each body may be of equal diameter.

Thus, in this way, the system may provide for improved efficiency in power transmission through the first and second bodies being of equal size. Thus, the system may provide for efficient power transmission whilst ensuring that the system remains compact.

Optionally, the bodies may be spaced between about 1 mm to 100 mm apart.

Thus, in this way, the system may be loosely coupled, tightly coupled, or critically coupled, where power transfer is optimal. Thus, the inductors may be spaced such that at least a substantial portion of the flux transmitted from the the first inductor is received by the second inductor.

Preferably, the system is not overcoupled, wherein the secondary coil is so close that the primary field is collapsed.

Optionally, the bodies may be spaced between about 10 mm to 20 mm apart.

Thus, in this way, the system satisfies the 'critically coupled' condition, where the transfer in the passband is optimal. Thus, the bodies may be arranged to provide improved efficiency in the transfer of power from the first inductor to the second inductor.

Optionally, the system may be configured for use in an azimuth thruster.

Thus, in this way, the system may be used to power one or more components typically used within a closed-cell azimuth thruster. Alternatively, the system may be used in any such further system requiring contactless transfer of power.

Thus, in this way, the diameter of the system may preferably be smaller than the outer diameter of the azimuth thruster housing and larger than the diameter of the shaft of the azimuth thruster. The diameter of the respective bodies may thus be subject to the space available between shaft and thruster wall. Thus, in this way, the bodies may be installed in the upper, cone shaped section of the thruster. The first body may be fixed to the inside of the thruster closing lid, while the second body may be fixed to inner portion of the thruster. Thus, in this way, the transformer may not be mounted to the shaft but only to the thruster wall. Thus, the system enables continuous power transfer regardless of the steering angle of the thruster.

Additionally or alternatively, the second "rotating" body may be replaced by a small resonating receiver. This resonator may only overlap with the static ring by about 10% of the ring. Thus, this type of second "rotating" body may be used in systems where space for first and second bodies of equal diameter and shape is reduced. In such instances, the performance of the system may reduce as a function of the reducing sizing of the second body.

Examples of the present disclosure may be used within gas turbine designs. Thus, the system could be used to transfer power into rotating sections of the gears, or for data transfer from a rotating part of a gear box to a static section. Thus, the system may be used for Equipment Health Monitoring (EHM) data acquired by, for example, vibration and/or temperature sensors.

Optionally, the system may be additionally configured for data transfer.

Thus, in this way, the system may be used for contactless transfer of one or more of power and data. It will be appreciated that the transfer of power and data may be concurrent using single or multiple resonant oscillators. Alternatively, the transfer of power and data may be consecutive using single or multiple resonant oscillators. Thus, in this way, certain resonant oscillators may be used for power transfer and certain resonant oscillators for data transfer. Alternatively, power and data may be transferred within the same resonant oscillator. Thus, in this way, if used within an azimuth thruster, it will be appreciated that the transmitting ring may be inside the thruster while the receiving ring may be fixed to the static lid of the thruster.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'fitted', 'connected' and 'coupled' mean operationally fitted, connected and coupled. It should be appreciated that there may be any number of intervening components between the mentioned features, including no intervening components.

Figure 1:
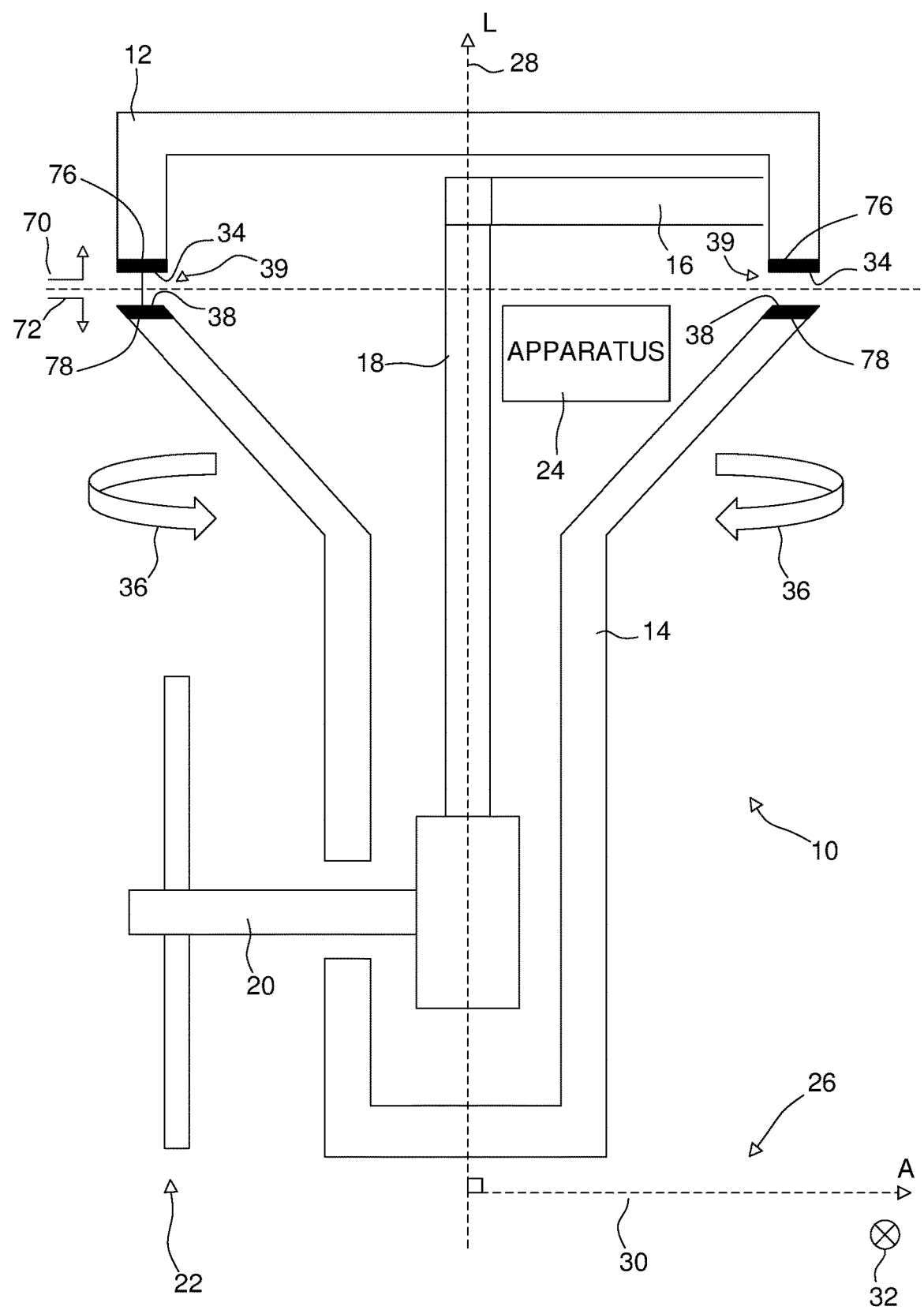
FIG. 1 illustrates a cross sectional side view of an azimuth thruster according to various examples.

With reference to FIG. 1, FIG. 1 illustrates a cross sectional side view of an azimuth thruster 10 according to various examples. The azimuth thruster 10 comprises an upper housing 12, a lower housing 14, an input shaft 16, a vertical shaft 18, a propeller shaft 20, a propeller 22, and apparatus 24. FIG. 1 also illustrates a cylindrical coordinate system 26 including a longitudinal axis 28, a polar axis 30 and an azimuth 32 that are orthogonal to one another. Also shown in FIG. 1 is a first and second body 76, 78 arranged upon the upper housing 12 and a lower housing 14 respectively.

The upper housing 12 of the azimuth thruster may be coupled to a hull of a vessel and may be stationary relative to the hull. The upper housing 12 houses the input shaft 16 and a part of the vertical shaft 18. The upper housing 12 includes a first surface 34 that defines an annulus and is oriented perpendicular to the longitudinal axis 28 and parallel to the polar axis 30.

The lower housing 14 houses a part of the vertical shaft 18, and a part of the propeller shaft 20. The lower housing 14 of the azimuth thruster 10 is rotatable relative to the upper housing 12 about the longitudinal axis 28 as indicated by the arrows 36 (that is, along the azimuth 32). The lower housing 14 includes a second surface 38 that defines an annulus and is oriented perpendicular to the longitudinal axis 28 and parallel to the polar axis 30.

The upper housing 12 and the lower housing 14 are positioned so that the first surface 34 and the second surface 38 are adjacent to one another and define a gap 39 there between. The second surface 38 of the lower housing 14 is rotatable relative to the first surface 34 of the upper housing 12 and may rotate three hundred and sixty degrees relative to the first surface 34.

The input shaft 16, the vertical shaft 18, and the propeller shaft 22 may be coupled via suitable gears and form a drive train between an engine mounted in a hull of a vessel (not illustrated in FIG. 1) and the propeller 22. In operation, the engine provides torque to the drive train to rotate the propeller 22 and thereby propel and/or steer the vessel.

The apparatus 24 is positioned within at least the second housing 14 (in some examples, the apparatus 24 may be positioned within the first and second housings 12, 14), and is described in greater detail in the following paragraphs with reference to FIG. 2.

Figure 2:
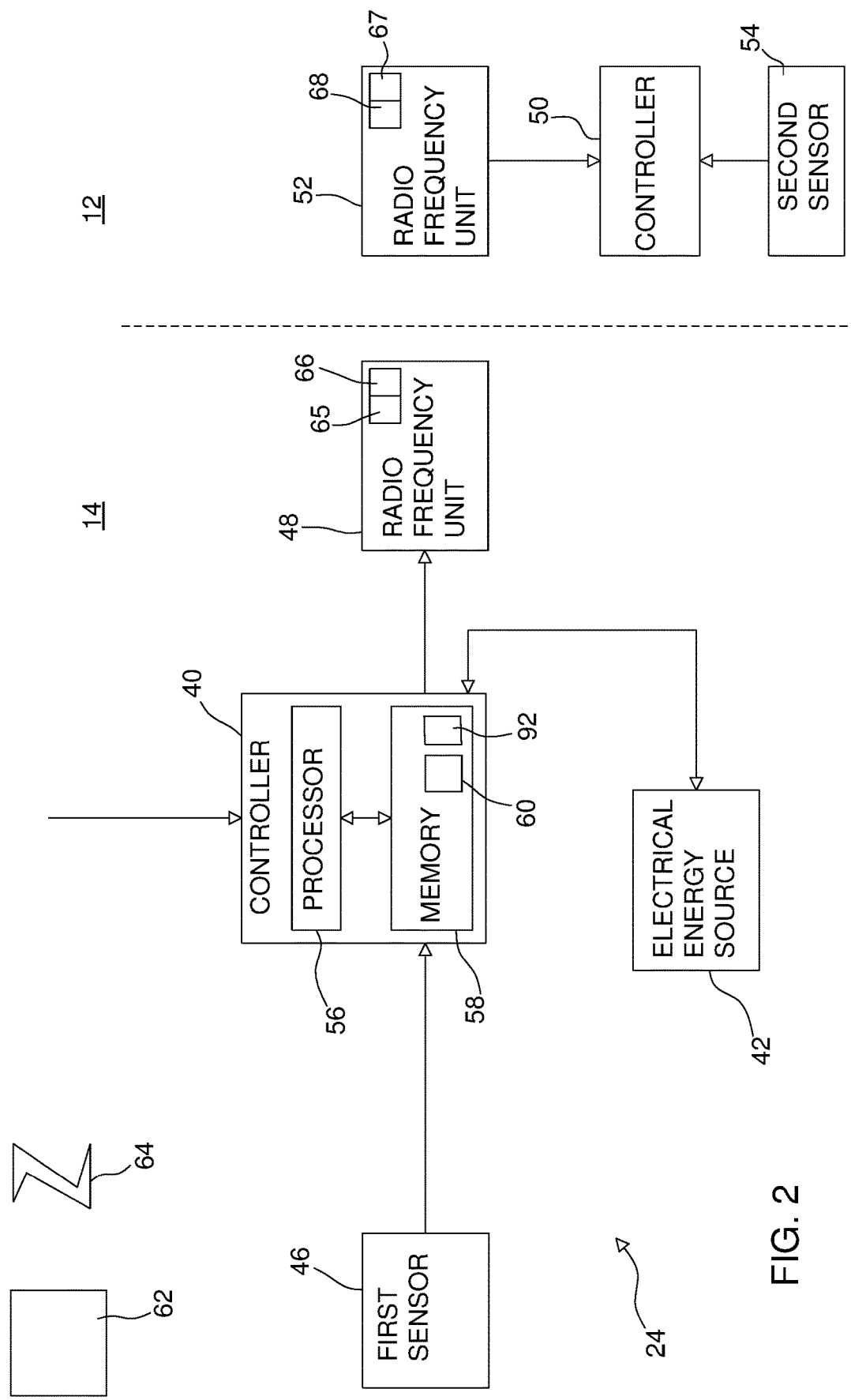
FIG. 2 illustrates a schematic diagram of apparatus for controlling transmission of data according to various examples.

FIG. 2 illustrates a schematic diagram of apparatus 24 for controlling transmission of data. The apparatus 24 includes a controller 40, an electrical energy source 42, a first sensor 46, a radio frequency unit 48, a further controller 50, a radio frequency unit 52 and a second sensor 54. The controller 40, the electrical energy source 42, the first sensor 46 and the radio frequency unit 48 may be positioned within, and/or mounted on, the second housing 14. The further controller 50, radio frequency receiver 52, and the second sensor 54 may be positioned within, and/or mounted on, the first housing 12.

In some examples, the apparatus 24 may be a module. As used herein, the wording 'module' refers to a device or apparatus where one or more features are included at a later time, and possibly, by another manufacturer or by an end user. For example, where the apparatus 24 is a module, the apparatus 24 may only include the controller 40, and the remaining features may be added by another manufacturer, or by an end user. By way of another example, where the apparatus 24 is a module, the apparatus 24 may only include the controller 40, the first sensor 46, the electrical energy source 42, and the radio frequency unit 48.

Figure 8:
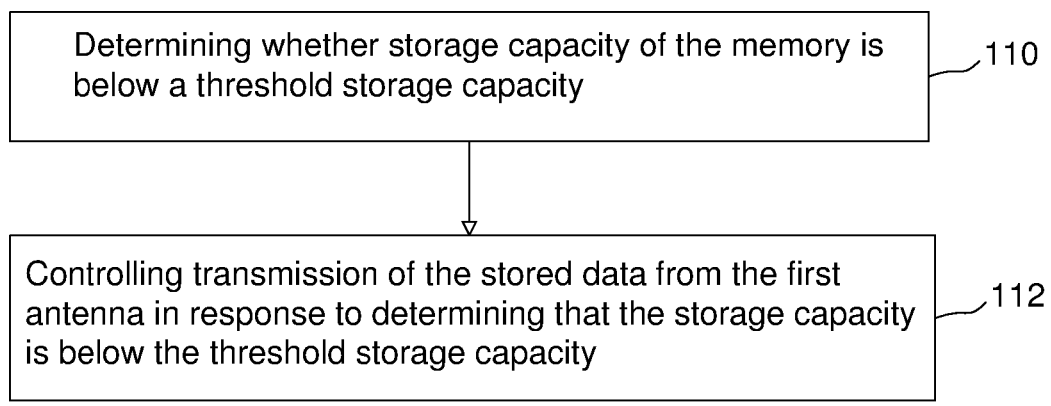
FIG. 8 illustrates a flow diagram of another method for controlling transmission of data according to various examples.
Figure 9:
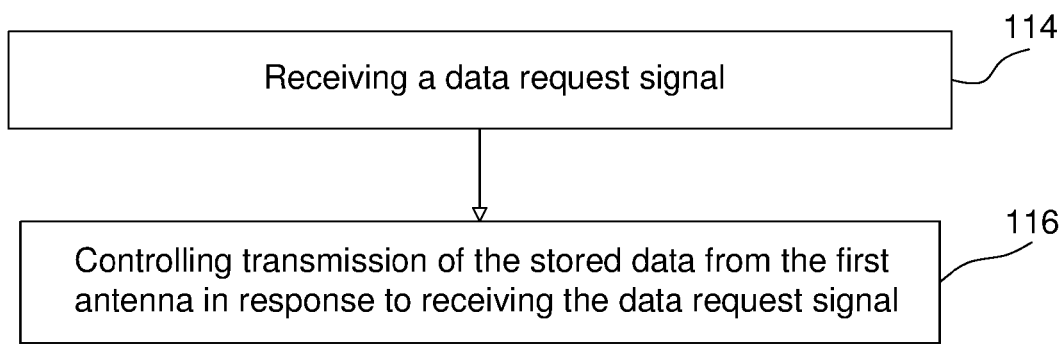
FIG. 9 illustrates a flow diagram of a further method for controlling transmission of data according to various examples.

The controller 40 may comprise any suitable circuitry to cause performance of the methods described herein and as illustrated in FIGS. 8 and 9. The controller 40 may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

By way of an example, the controller 40 may comprise at least one processor 56 and at least one memory 58. The memory 58 stores a computer program 60 comprising computer readable instructions that, when read by the processor 56, causes performance of the methods described herein, and as illustrated in FIGS. 8, 9 and 10. The computer program 60 may be software or firmware, or may be a combination of software and firmware.

The processor 56 may include at least one microprocessor and may comprise a single core processor, may comprise multiple processor cores (such as a dual core processor, a quad core processor), or may comprise a plurality of processors (at least one of which may comprise multiple processor cores).

The memory 58 may be any suitable non-transitory computer readable storage medium, data storage device or devices, and may comprise a hard disk and/or solid state memory (such as flash memory). The memory 58 may be permanent non-removable memory, or may be removable memory (such as a universal serial bus (USB) flash drive).

The computer program 60 may be stored on a non-transitory computer readable storage medium 62. The computer program 60 may be transferred from the non-transitory computer readable storage medium 62 to the memory 58. The non-transitory computer readable storage medium 62 may be, for example, a secure digital (SD) memory card, a Universal Serial Bus (USB) flash drive, a compact disc (CD), a digital versatile disc (DVD) or a Blu-ray disc. In some examples, the computer program 60 may be transferred to the memory 58 via a signal 64 (such as a wireless signal or a wired signal).

The electrical energy source 42 may comprise any suitable apparatus, device or devices for providing electrical energy to the apparatus 24. For example, the electrical energy source 42 may comprise an inductor and/or resonant oscillator arrangement for transferring electrical energy from the first housing 12 to the second housing 14 (as illustrated in FIGS. 4, 4A, 4B, 5A and 5B).

The first sensor 46 may be any suitable device or devices for sensing at least one operating condition of the azimuth thruster. For example, the first sensor 46 may comprise a device or devices for sensing vibration and/or temperature of at least a part of the azimuth thruster. The controller 40 is configured to receive data from the first sensor 46.

In various examples, the first sensor 46 may be arranged to measure vibration at four locations (that is, at bearings and gearboxes). The vibration sensors may be high data rate (high sample frequency, high resolution). The first sensor 46 may comprise thermal sensors, which may be low data rate (low frequency, low resolution). The first sensor 46 may include sensors for sensing acoustic waves, and/or oil quality, and/or oil pressure, and/or strain, and/or oil pressure. In some examples, the data for the at least one operating condition (for example, vibration and thermal data) may be measured continuously. In other examples, the data for the at least one operating condition may be sampled data and/or characteristic data and/or compressed data. Characteristic data can include a fast Fourier transform (FFT) of a frequency signal for example, or data indicating that certain temperatures have been exceeded.

The radio frequency unit 48 includes transmitter circuitry 65 and a first antenna 66. The radio frequency unit 48 may be configured to operate at any suitable frequency band and using any suitable protocol. For example, the radio frequency unit 48 may be configured to operate at 2.4 GHz, and/or 5 GHz and/or 60 GHz using a wireless local area network protocol (such as the WiFi standard). In other examples, different transmission frequencies may be used (even transmission frequencies outside the defined radio frequency bands, inside a sealed metal environment), or a unique protocol may be used instead of a commercial one. The transmitter circuitry 65 is coupled to the first antenna 66 and is configured to encode signals from the controller 40 and provide the encoded signals to the first antenna 66 for transmission. The radio frequency unit 48 may additionally include receiver circuitry coupled to the first antenna 66 for decoding signals received by the first antenna 66 and for providing the decoded signals to the controller 40. In some examples, the radio frequency unit 48 may comprise transceiver circuitry to provide both transmitter and receiver functionality.

Figure 3A:
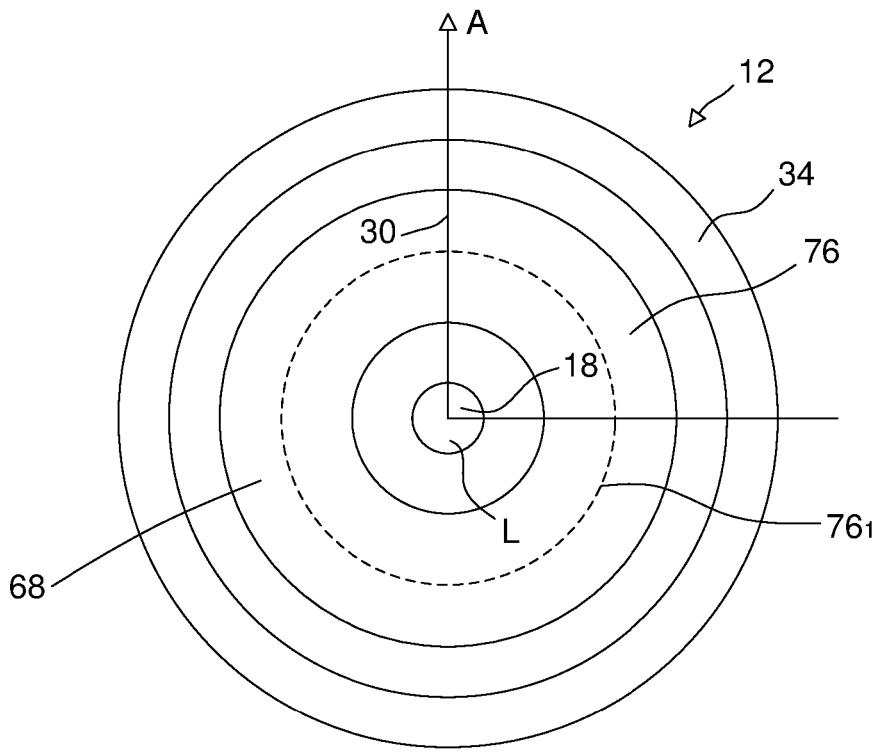
FIG. 3A illustrates a plan view of an upper housing of an azimuth thruster according to various examples.
Figure 3B:
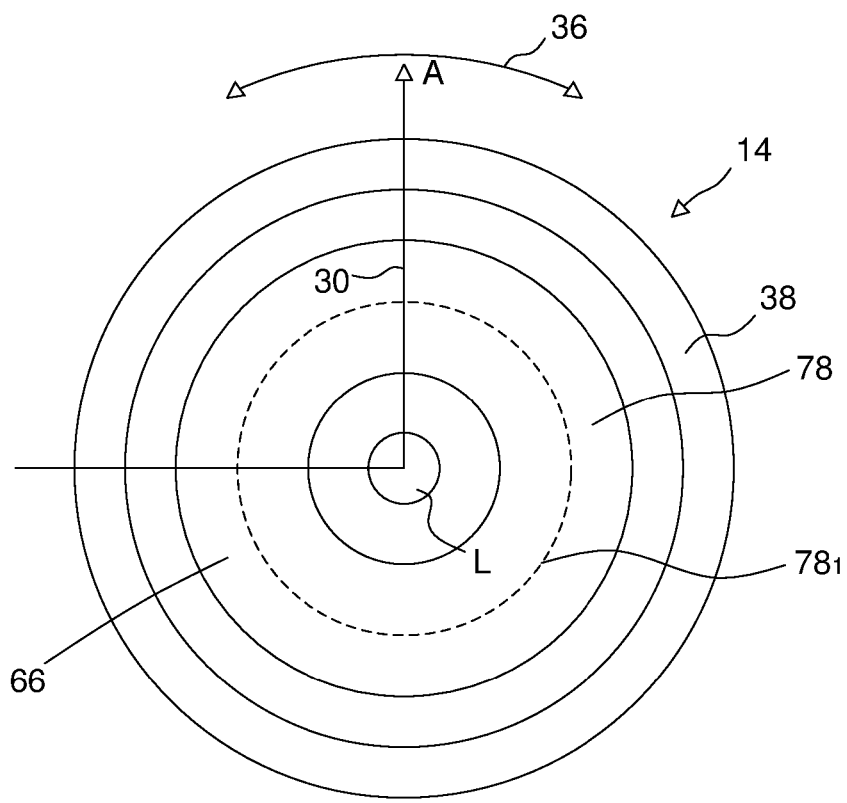
FIG. 3B illustrates a plan view of a lower housing of an azimuth thruster according to various examples.

FIG. 3A illustrates a plan view of the upper housing 12 of the azimuth thruster 10 as viewed along arrow 70 in FIG. 1. The first body 76 of the upper housing 12 has a circular shape and the second antenna 68 is concentrically arranged within the first body 76 at a predetermined radial position around the body's circumference. As illustrated in FIGS. 3A and 3B, the second antenna 68 and first antenna 66 overlay one another when the azimuth thruster 10 is viewed in plan and defines a minimum distance there between (one millimetre to one hundred millimetres for example). As the lower housing 14 rotates relative to the upper housing 12, as the first body 76 and the power second body 78 are configured to generate an electrical current, and hence form a transformer, at all relative rotational positions, the angular coordinate of the first antenna 66 does not change as the lower housing 14 rotates relative to the upper housing 12.

The controller 50 may comprise any suitable circuitry as described in the above paragraphs for the controller 40 and is therefore not described in any greater detail. The controller 50 may be positioned within the first housing 12 of the azimuth thruster 10, or within a part of a vessel to which the azimuth thruster 10 is fitted. In some examples, the controller 50 may be distributed between the first housing 12 of the azimuth thruster 10 and a vessel to which the azimuth thruster 10 is fitted.

The radio frequency unit 52 includes receiver circuitry 67 and a first antenna 68. The radio frequency unit 52 is configured to operate at the same frequency band and protocol as the radio frequency unit 48. For example, where the radio frequency unit 48 is configured to operate at 2.4 GHz using a wireless local area network protocol, the radio frequency unit 52 is also configured to operate at 2.4 GHz using the same wireless local area network protocol. The receiver circuitry 67 is coupled to the first antenna 68 and is configured to decode signals received by the first antenna 68 and to provide the decoded signals to the further controller 50. The radio frequency unit 52 may additionally include transmitter circuitry coupled to the first antenna 68 to encode signals from the further controller 50 and provide the encoded signals to the first antenna 68 for transmission. In some examples, the radio frequency unit 52 may comprise transceiver circuitry to provide both transmitter and receiver functionality.

FIG. 3B illustrates a plan view of the lower housing 14 of the azimuth thruster 10 as viewed along arrow 72 in FIG. 1. The second body 78 of the lower housing 14 has a circular shape and the first antenna 66 is concentrically arranged within the first body 76 at a predetermined radial position around the body's circumference. It should be appreciated that since the lower housing 14 is rotatable relative to the upper housing 12, as the first body 76 and the power second body 78 are configured to generate an electrical current, and hence form a transformer, at all relative rotational positions, the angular coordinate of the first antenna 66 does not change as the lower housing 14 rotates relative to the upper housing 12.

Returning to FIG. 2, the second sensor 54 is configured to sense the position of the lower housing 14 relative to the upper housing 12 and provide the sensed position to the controller 50. The second sensor 54 may include any suitable apparatus or device for sensing the position of the lower housing 14 and may include stepper motor control feedback where the number of steps is used to deduce position, or the detection of features in the structure, to indicate position (detection of features may be performed using an image sensor and image recognition, or may be performed using a sensor that physically senses the features in the structure). In one example, the steering angle (azimuth angle) of the azimuth thruster 10 is measured and generated in a transmitter box that is located at the top of a steering cover of the azimuth thruster 10. The transmitter box is arranged to mechanically measure the steering angle of the azimuth thruster 10. An azimuth steering signal (an analog signal) is transmitted to an azimuth control unit (ACU). The azimuth steering signal is transmitted from the azimuth control unit (ACU) or direct from the transmitter box to the condition monitoring cabinet (CMU XCM1). The transmitter box may also include control pitch angle (CP) devices.

The further controller 50 is configured to receive the sensed position of the lower housing 14 and may be configured to control a display to display the sensed position to enable an operator to determine the direction of thrust provided by the azimuth thruster 10.

Figure 4:
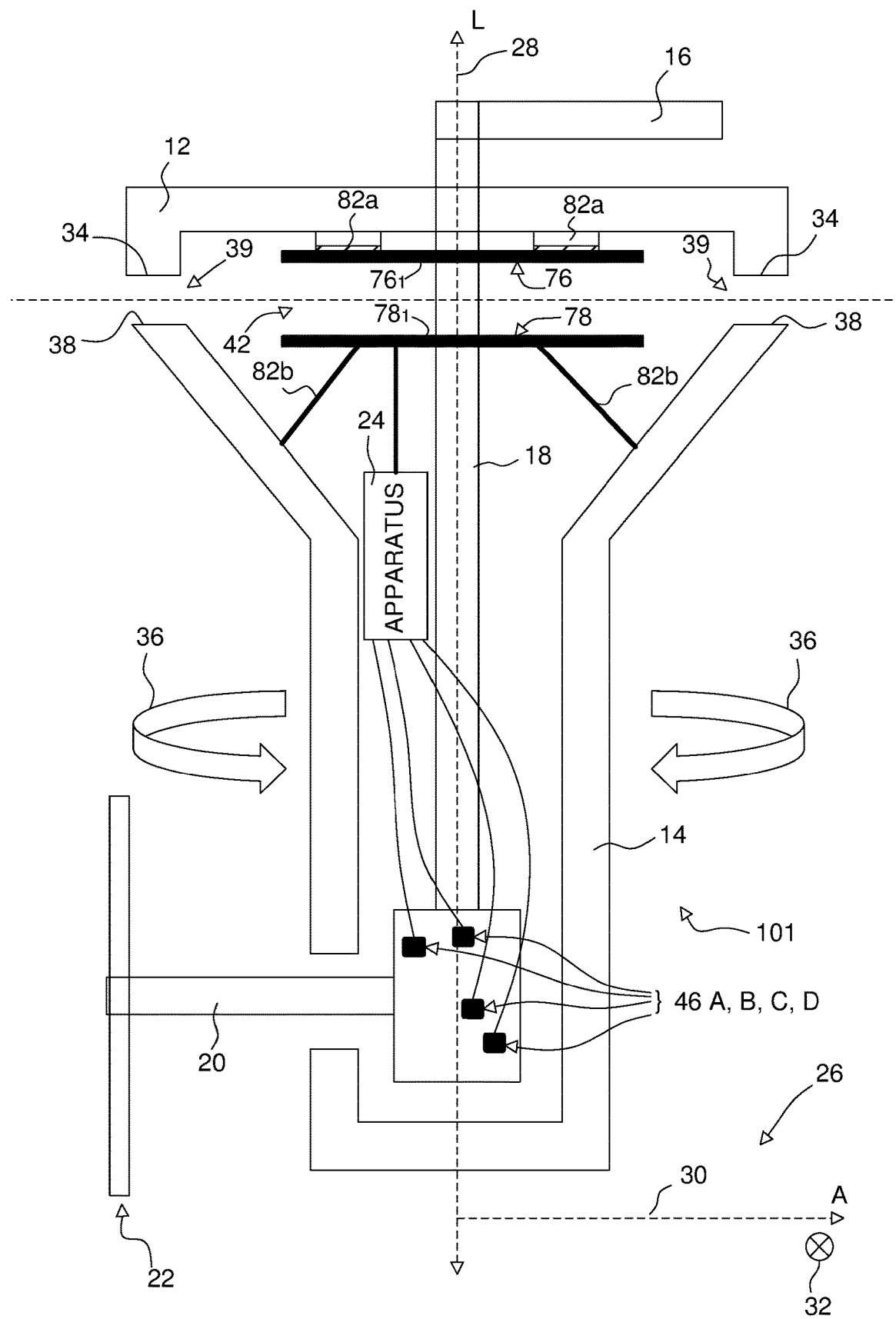
FIG. 4 illustrates a cross sectional side view of a further azimuth thruster according to various examples.

FIG. 4 illustrates a cross sectional side view of a further azimuth thruster 101 according to various examples. The azimuth thruster 101 shares similar features in construction to the azimuth thruster 10. Where the features are similar, the same reference numerals are used. In this example, the electrical energy source 42 comprises a first body 76 and a second body 78 for transferring electrical energy from the upper housing 12 side of the azimuth thruster 101 to the lower housing 14 side of the azimuth thruster 101, the shaft extending through the upper housing 12 before coupling with the input shaft 16. It will thus be appreciated that the bodies may comprise, for example, any one or more of a plate, member, or shaped portion of any suitable dimension.

In more detail, the first body 76 comprises one or more first inductors $76_1$ and the second body comprises one or more second inductors $78_1$. It will be appreciated that the or each inductor may be, for example, resonant or non-resonant, or may comprise a resonant oscillator. Additionally, first inductors $76_{1-4}$ etc. and second inductors $78_{1-4}$ etc. may be embedded, mounted, attached or integrated within the first body 76 and second body 78 respectively. Accordingly, the or each first inductor $76_{1-4}$ etc. and second inductor $78_{1-4}$ etc. transfer electrical energy from the upper housing 12 side of the azimuth thruster 101 to the lower housing 14 side of the azimuth thruster 101, the lower housing 14 side of the azimuth thruster 101 housing the apparatus 24. In this instance, the apparatus 24 is shown to be in electrical communication with sensors 46 A-D for sensing at least one operating condition of the azimuth thruster 101. It will also be appreciated that any suitable number of sensors may be included within the sensory system, any one or more of the sensors 46 A-D monitoring one or more operations conditions.

In more detail, the first body 76 may be provided in the form of a plate, torus, polygon, hemisphere, cube, cone, cylinder, parallelepiped or any further three-dimensional shape suitable for the embedding, mounting, attaching or integrating of one or more first inductors $76_{1-4}$ etc. within the first body 76. As illustrated in FIG. 4, the first body 76 is attached via attachment members 82a to the upper housing 12. Attachment members 82a provide an insulated portion to electrically isolate the first body 76 from the upper housing 12 and maintain the first body 76 at a predetermined offset from the second body 78. Additionally, attachment members 82a prevent rotation of the first body 76 relative to the upper housing 12.

In more detail, the second body 78 may be provided in the form of a plate, torus, polygon, hemisphere, cube, cone, cylinder, parallelepiped or any further three-dimensional shape suitable for the embedding, mounting, attaching or integrating of one or more second inductors $78_{1-4}$ etc. within the second body 78 respectively. The second body 78 is attached via attachment members 82*b* to the lower housing 84. Attachment members 82*b* provide an insulated portion to electrically isolate the second body 78 from the lower housing 14 and maintain the second body 78 at a predetermined offset from the first body 76. The predetermined offset from the first body 76 to the second body 78 is maintained between about one to one hundred millimetres apart. The predetermined offset from the first body 76 to the second body 78 is, in some examples, maintained between about ten to twenty millimetres apart, subject to transformer performance. It will however be appreciated that any such range may be appropriate, subject to transformer performance.

Additionally, attachment members 82*b* prevent rotation of the second body 78 relative to the lower housing 14. As such, lower housing 14, comprising second body 78 and attachment members 82*b*, is rotatable relative to the upper housing 12, comprising first body 76 and attachment members 82*a*. The lower housing 14 may therefore rotate three hundred and sixty degrees relative to the upper housing 12.

First and second bodies 76, 78 are shown to be mounted to the thruster wall and radially spaced from the shaft 18. The diameter of the first and second bodies 76, 78 is shown in FIG. 4 to be smaller than the outer diameter of the upper housing 12 and larger than the diameter of the vertical shaft 18 comprised within the thruster 101. The vertical shaft 18 is shown to pass through a centrally mounted hole within the first and second bodies 76, 78, the vertical shaft 18 additionally passing through the upper housing 12 and lower housing 14. Thus, the hole within the respective first and second bodies 76, 78 is concentrically arranged such that the vertical shaft 18 is not compromised by contact with either of the first and second bodies 76, 78 during rotation of the lower housing 14 relative to the upper housing 12. Thus, first and second bodies 76, 78 are concentrically arranged around the shaft 18. Accordingly, the or each first inductor $76_1$ and second inductor $78_1$ is concentrically arranged around the shaft 18.

In some examples, the or each first inductor $76_1$ and second inductor $78_1$ are concentrically wound coils of wire configured within the first and second bodies 76, 78 respectively. In a further example, the or each first inductor $76_1$ and second inductor $78_1$ are comprised of one or more induction rings configured within the first and second bodies 76, 78 respectively. Thus, the or each first inductor $76_1$ and second inductor $78_1$ is concentrically located around one or more of the hole within the respective first and second bodies 76, 78 or the vertical shaft 18. Each coil or ring may comprise additional coatings or shielding. The shielding may comprise a polymeric coating.

Figure 4A:
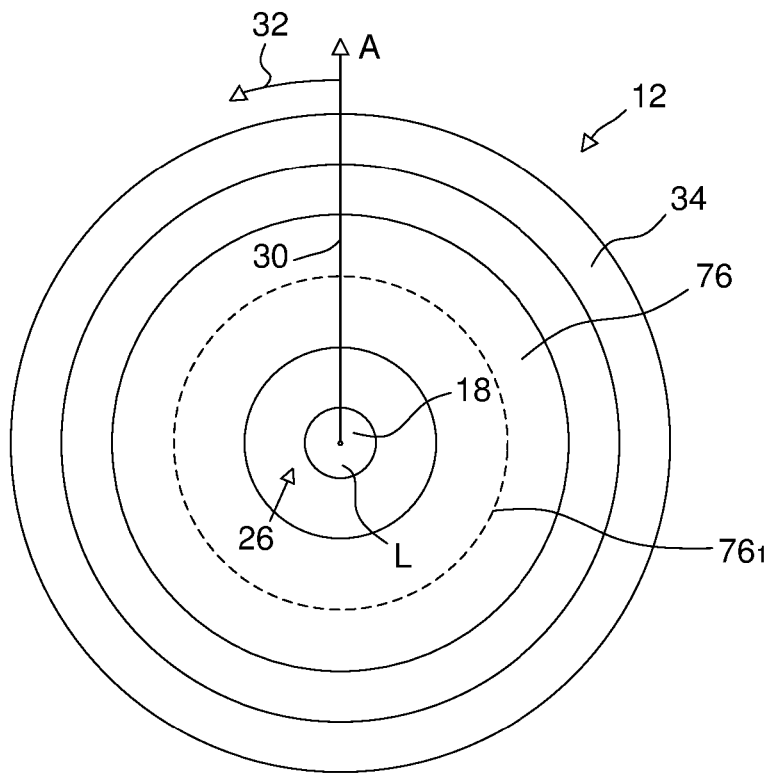
FIG. 4A illustrates a plan view of the upper housing of the azimuth thruster illustrated in FIG. 4.
Figure 4B:
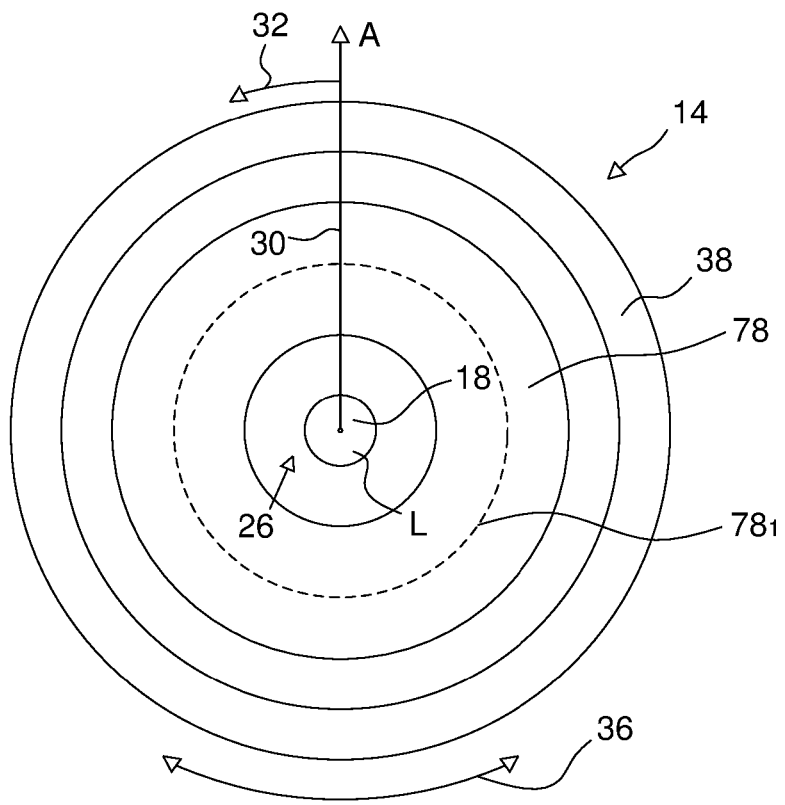
FIG. 4B illustrates a plan view of the lower housing of the azimuth thruster illustrated in FIG. 4.

The first inductor $76_1$ and the second inductor $78_1$ may be configured in any suitable shape, structure or arrangement, and may include one or more conductors (such as an enamel insulated copper conductor) coiled (in the case of one or more coils) or located (in the case of one or more induction rings) within each of the first body 76 and second bodies 78 respectively. As illustrated in FIG. 4A, the first body 76 is attached via attachment members 82*a* to the upper housing 12 and is configured to generate an electrical current from the one or more magnetic fields generated by the first inductor $76_1$. As illustrated in FIG. 4B, the second body 78 is attached via attachment members 82*b* to the lower housing 14 and is configured to receive a magnetic field generated by the first inductor $76_1$ via the second inductor $78_1$. Upon rotation of the lower housing 14 comprising the second body 78 relative to the upper housing 12 comprising the first body 76, the first inductor $76_1$ and the second inductor $78_1$ are radially aligned relative to one another such that the inductors $76_1$, $78_1$ remain in an overlapping configuration. Thus, as the first body 76 and second body 78, and hence the first inductor $76_1$ and the second inductor $78_1$ are configured to generate an electrical current from the magnetic field at all relative rotational positions, power transmission is continuous.

Figure 5A:
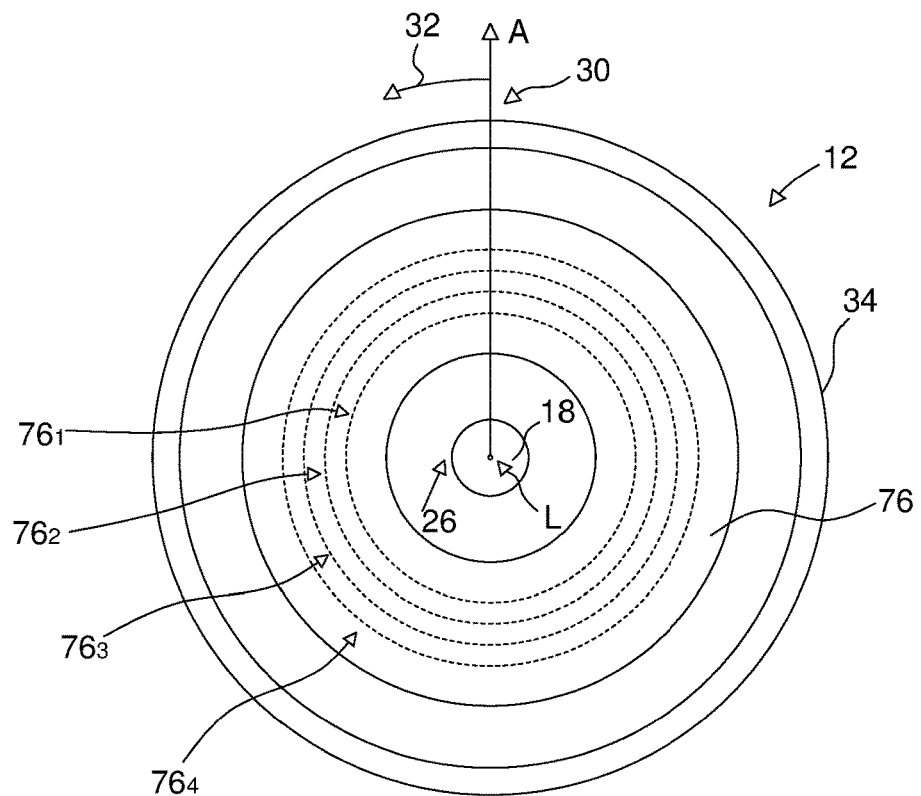
FIG. 5A illustrates a plan view of alternative first body arrangement of the azimuth thruster illustrated in FIGS. 4A and 4B.
Figure 5B:
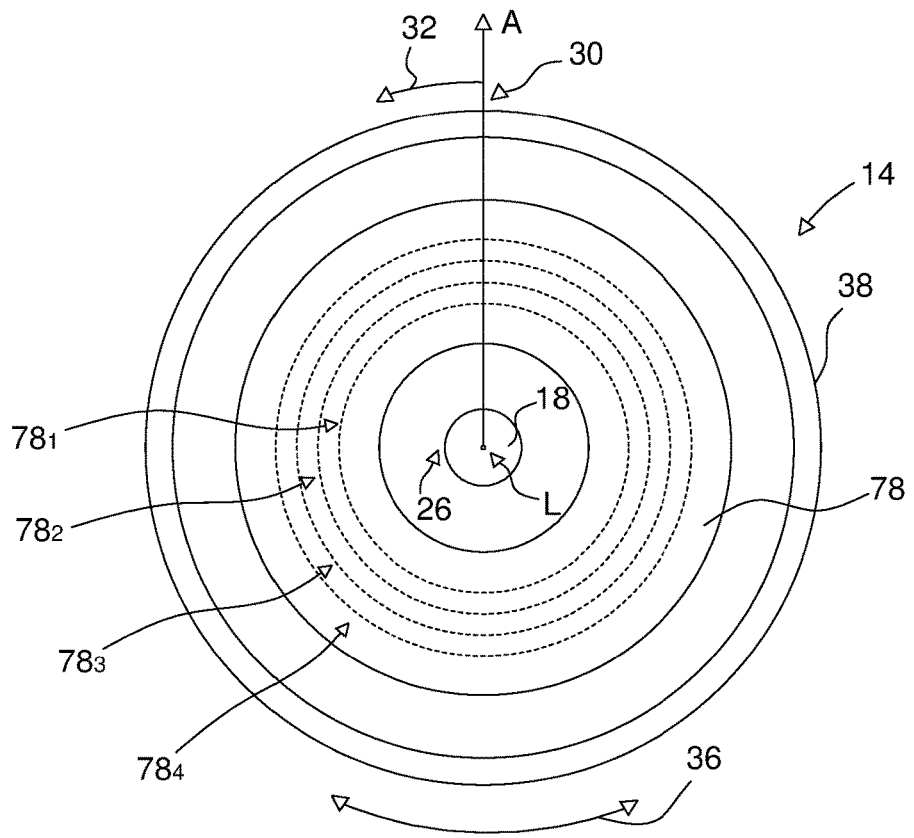
FIG. 5B illustrates a plan view of a further alternative second body arrangement of the azimuth thruster illustrated in FIGS. 4A and 4B.
Figure 5C:
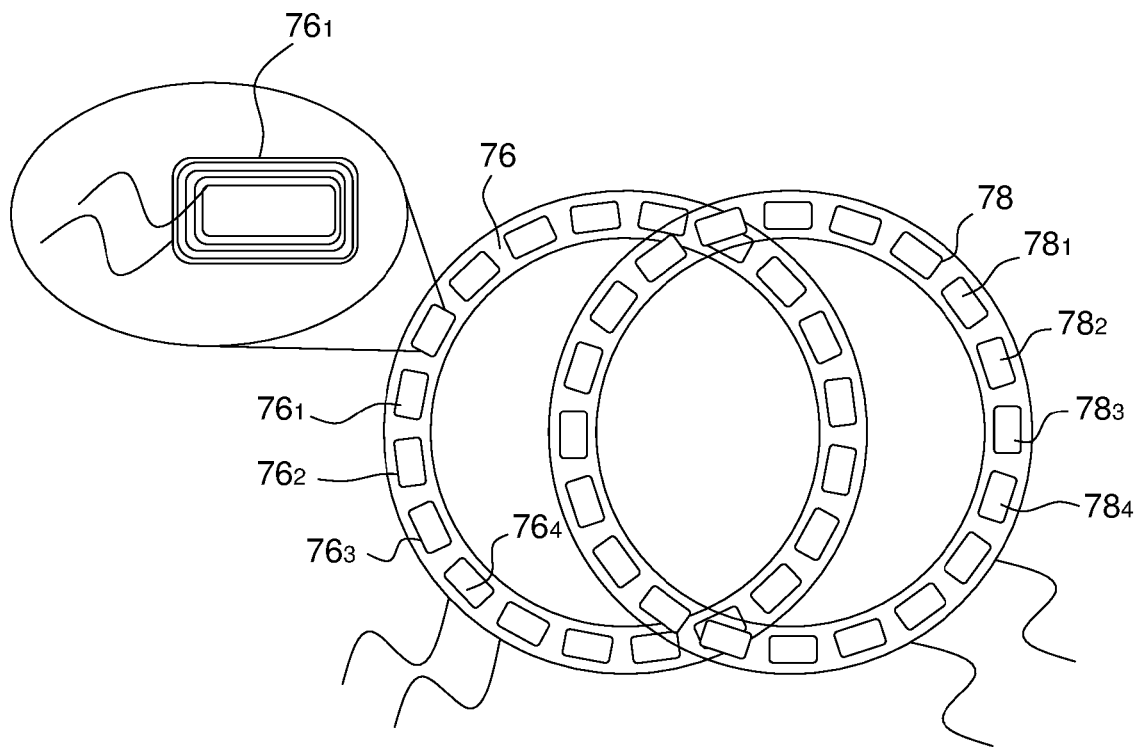
FIG. 5C illustrates an exploded plan view of apparatus for transferring electrical energy according to various examples.
Figure 5D:
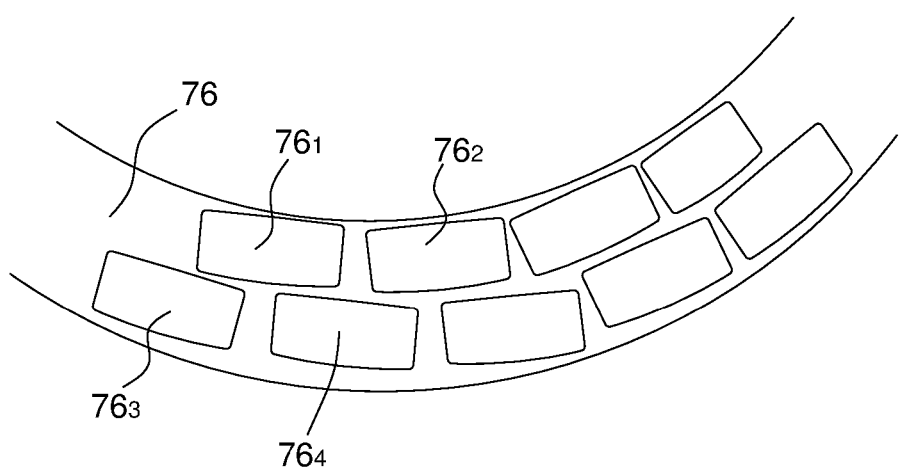
FIG. 5D illustrates a plan view of further apparatus for transferring electrical energy according to various examples.

Thus, as shown in FIGS. 5C and 5D, examples comprising multiple inductors configured around the circumference of the respective first body 76 and second bodies 78, first inductors $76_{1-4}$ etc. and second inductors $78_{1-4}$ etc. may be configured to maintain a resonant circuit, and hence form a transformer at all relative rotational positions. However, in an example comprising one or more inductors configured within one or more respective portions of the respective first body 76 and second bodies 78 such that first inductors $76_{1-4}$ etc. and second inductors $78_{1-4}$ etc. are not configured to maintain a resonant circuit, and hence form a transformer at all relative rotational positions, power transmission is not continuous.

The second body 78 may be coupled to an electronic component (such as radio frequency circuitry) to provide the generated electrical current to the electronic component. In some examples, the first body 76 is coupled to an electronic component via an alternating current to direct current (AC/DC) converter, and a filter (such as a diode rectifier and capacitor).

The arrangements described above and illustrated in FIGS. 4 to 4B are advantageous insofar that they enable electrical signals and/or power to be continuously supplied between the upper and lower housings 12, 14 for each and every orientation of the lower housing 14 relative to the upper housing 12. Additionally, the body arrangement 76 and 78 allows improved use of space due to reduced module footprint, plus means of power transfer such that additional power may be transferred between the upper housing 12 and lower housing 14. The body arrangement 76 and 78 also allows improved maintainability. Where the azimuth thruster 101 is fitted to a vessel such as a tug boat (where the azimuth thruster 101 may be used frequently in a multitude of different directions), the arrangement illustrated in FIGS. 4 to 4B are thus advantageous in that they enable the transfer of electrical energy for each and every orientation of the azimuth thruster 101.

FIGS. 5A and 5B illustrate first inductors $76_{1-4}$ and second inductors $78_{1-4}$ arranged in respective first bodies 76 and second bodies 78. Thus the arrangement of 5A and 5B enables first and second bodies of variable size and geometry to be easily manufactured according to requirements. Thus, as the diameter of the first body 76 and second body 78 is scalable, it is possible to mount the system according to FIGS. 4 to 5B into different sizes of azimuth thruster 101.

First inductors $76_{1-4}$ of the first body 76 (FIG. 5A) and second inductors $78_{1-4}$ of the second body (FIG. 5B) may be concentrically configured at differing radial positions within the respective first and second bodies 76, 78, each second inductor $78_{1-4}$ being located in a matching circumferential and/or radial locations relative to a respective first inductor $76_{1-4}$. Thus, a substantially constant degree of overlap between the inductors $76_{1-4}$, $78_{1-4}$ is maintained at all relative rotational positions. In such an embodiment, the overlapping first inductors $76_{1-4}$ and the second inductors $78_{1-4}$ remain configured to generate an electrical current and, hence, form a transformer at all relative rotational positions. Thus, power transmission is continuous during operation of the thruster.

The arrangements described in FIGS. 4A to 5B are advantageous insofar that they enable electrical signals and/or power to be continuously supplied between the upper and lower housings 12, 14 for each and every orientation of the lower housing 14 relative to the upper housing 12. The system may thus negate the use of a battery or temporary storage of power within a closed cell system due to power transmission being maintained at all times. Additionally, the body arrangement 76 and 78 allows improved use of space due to reduced module footprint, plus means of power transfer such that additional power may be transferred between the upper housing 12 and lower housing 14. The body arrangement 76 and 78 allows improved maintainability. Where the azimuth thruster 101 is fitted to a vessel such as a tug boat (where the azimuth thruster 101 may be used frequently in a multitude of different directions), the arrangement illustrated in FIGS. 4 to 4B are thus advantageous in that they enable the transfer of electrical energy for each and every orientation of the azimuth thruster 101.

The arrangements of FIGS. 5A and 5B are additionally advantageous over the arrangements previously described as they provide for increasingly robust and reliable means of power transmission between the upper housing 12 and lower housing 14. Should one or more of the first inductors $76_{1-4}$ and second inductors $78_{1-4}$ fail, providing that at least one ring pair remains operational, power transmission will still be provided at all relative rotational positions. Additionally, due to improved coupling due to the configuration of the first 76 and second bodies 78, further electrical components may be supported within the system due to increased availability of power.

As shown in FIG. 5C, the first and second bodies 76, 78 are shown in an exploded (i.e. a non-concentric) arrangement for clarity. As such, the first inductors $76_{1-4}$ etc. and second inductors $78_{1-4}$ etc. are configured at matching radial locations within the concentric first and second bodies 76, 78 respectively. Thus, the plurality of first inductors $76_{1-4}$ etc. and second inductors $78_{1-4}$ etc. may themselves be radially configured around one or more of the holes within the respective first and second bodies 76, 78 and the vertical shaft 18.

In other examples shown in FIG. 5D, a plurality of first inductors $76_{1-4}$ etc. may additionally or alternatively be circumferentially positioned within the first body 76 at one or more respective radial locations. Corresponding second inductors $78_{1-4}$ etc. may thus be positioned within the second body 78 at matching circumferential and/or radial positions relative to the first inductors $76_{1-4}$ etc. Corresponding second inductors $78_{1-4}$ etc. may be equidistantly or, alternatively, disproportionately spaced around the perimeter of the second body 78 so as to maintain a degree of overlap between at least one of the first inductors $76_{1-4}$ etc. and the second inductors $78_{1-4}$ etc. at all relative rotational positions. In such an embodiment, the first inductors $76_{1-4}$ etc. and the second inductors $78_{1-4}$ etc. remain configured to maintain a resonant circuit and, hence, a transformer at all relative rotational positions. Thus, power transmission is continuous.

The second body 78 may be coupled to a first electronic component (such as radio frequency circuitry 24, 46A-D for example) to provide the generated electrical current. In some examples, the first body 76 is coupled to an electronic component via an alternating current to direct current (AC/DC) converter, and a filter (such as a diode rectifier and capacitor).

The arrangements described above and illustrated in FIGS. 4 to 5D are advantageous in that they enable electrical signals and/or power to be continuously supplied between the upper and lower housings 12, 14 for each and every orientation of the lower housing 14 relative to the upper housing 12. The system may thus negate the use of a battery or temporary storage of power within a closed cell system due to power transmission being maintained at all times. Where the azimuth thruster 101 is fitted to a vessel such as a tug boat (where the azimuth thruster 101 may be used frequently in a multitude of different directions), the arrangements illustrated in FIGS. 4 to 5D are thus advantageous in that they enable transfer of electrical energy for each and every orientation of the azimuth thruster 101.

Furthermore, the body arrangement 76 and 78 of FIGS. 4 to 5D allows improved use of space due to reduced module footprint, plus means of power transfer such that additional power may be transferred between the upper housing 12 and lower housing 14. The body arrangement 76 and 78 also allows improved maintainability due to enhanced ease of module replacement.

Additionally, first inductors $76_{1-4}$ etc. and second inductors $78_{1-4}$ etc. may be configured in respective the first body 76 and second body 78 to enable first and second bodies of variable size and geometry to be easily manufactured according to requirements. Thus, as the diameter of the first body 76 and second body 78 is scalable, it is possible to mount the system according to FIGS. 5C to 5D into different sizes of azimuth thruster 101.

The arrangements of FIGS. 4A to 5D are additionally advantageous over the arrangements previously described as they provide for increasingly robust and reliable means of power transmission between the upper housing 12 and lower housing 14. Should one or more of the first inductors $76_{1-4}$ and second inductors $78_{1-4}$ fail, providing that at least one pair of first inductors $76_{1-4}$ and second inductors $78_{1-4}$ remain overlapping, and thus operational, power transmission will still be provided at all relative rotational positions. Additionally, due to improved coupling and the ability to include larger capacity and/or higher power modules within the first 76 and second bodies 78 respectively, further or increasingly robust electrical components may be supported within the system due to increased availability of power.

Figure 6:
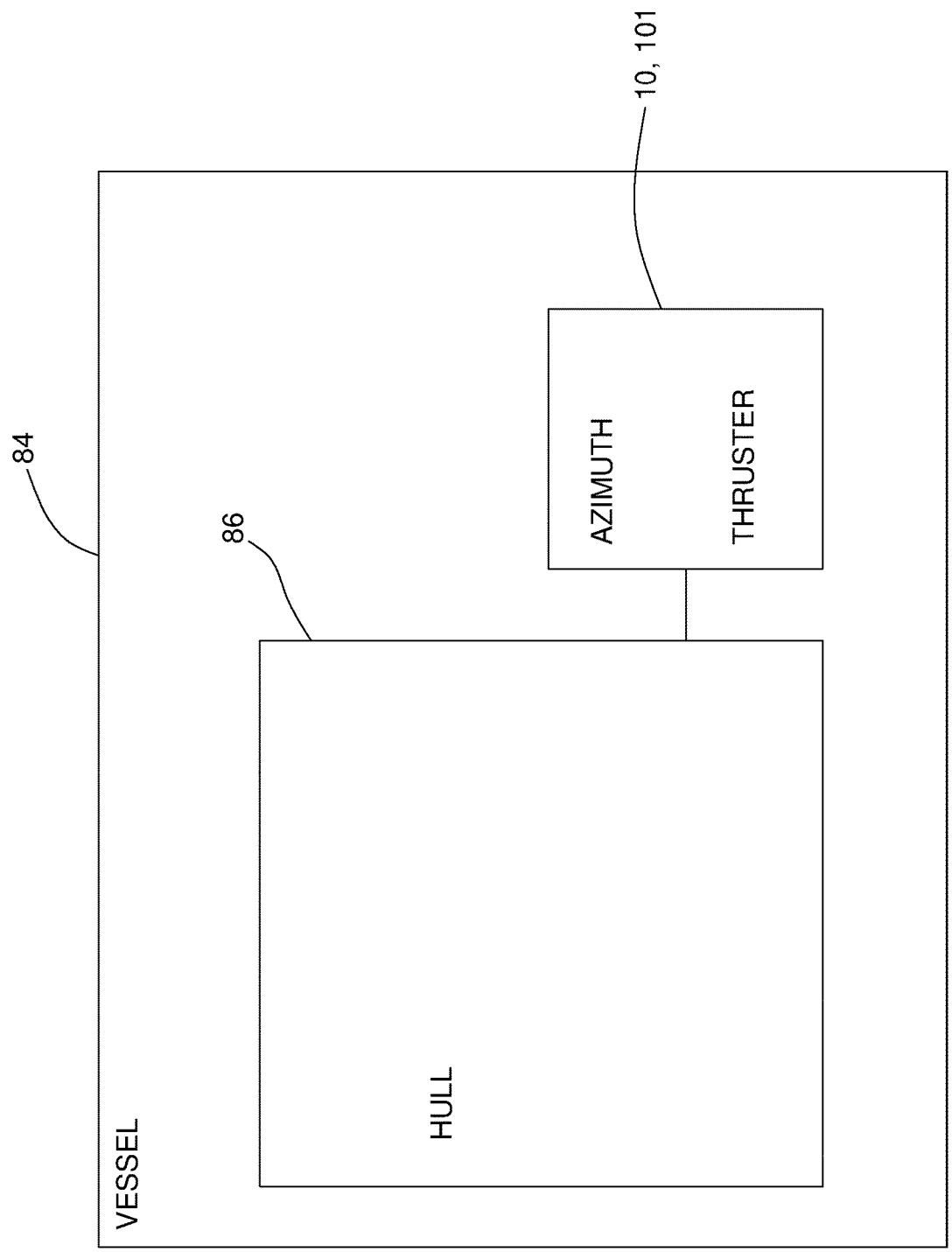
FIG. 6 illustrates a schematic diagram of a vessel according to various examples.

FIG. 6 illustrates a schematic diagram of a vessel 84 according to various examples. The vessel 84 may be any vessel for traversing an expanse of water. For example, the vessel 84 may be a cargo ship, a passenger vessel (such as a ferry), harbour work craft (such as a tug boat), or a fishing vessel. The vessel 84 may also be any vessel for maintaining a fixed position on an expanse of water relative to land. For example, the vessel 84 may be an offshore oil platform.

The vessel 84 comprises a hull 86 and one or more azimuth thrusters 10, 101 that are coupled to the hull 86. In some examples, the vessel 84 may comprise a plurality of azimuth thrusters 101 as illustrated in FIG. 4 to 4B, or a plurality of azimuth thrusters 101 as illustrated in FIG. 5A-5B.

Figure 7:
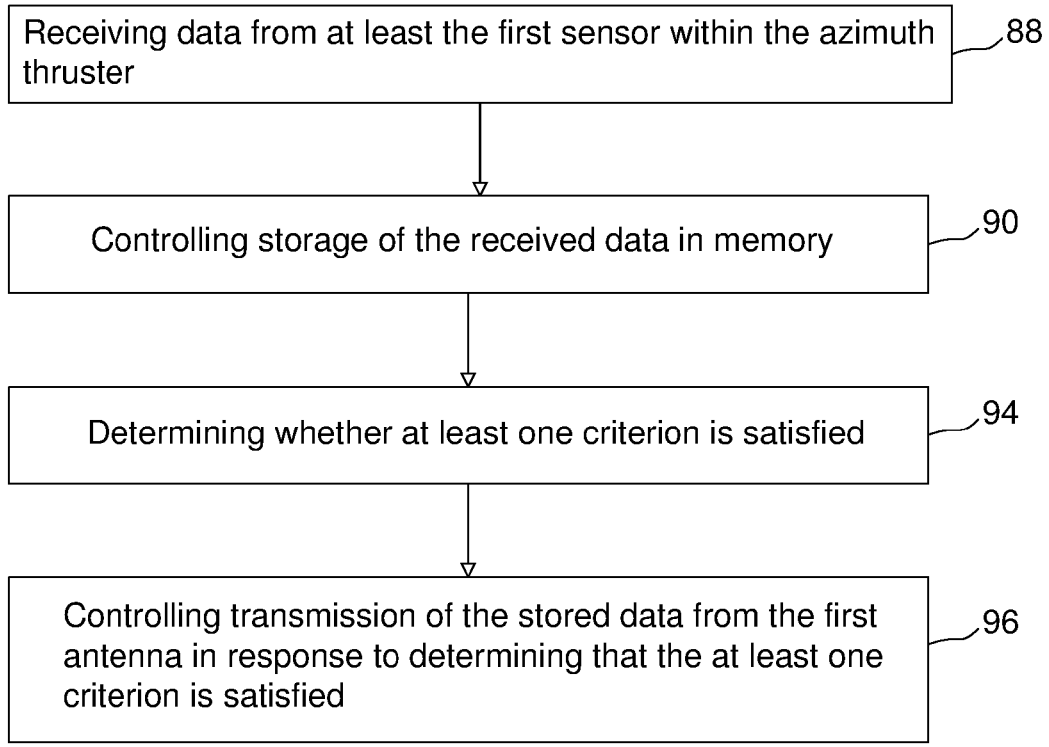
FIG. 7 illustrates a flow diagram of a method for controlling transmission of data according to various examples.

FIG. 7 illustrates a flow diagram of a method for controlling transmission of data according to various examples. At block 88, the method includes receiving data from at least the first sensor 46 within the azimuth thruster 10, 101. For example, the controller 40 may receive operational condition data of the azimuth thruster 10, 101 from the first sensor 46. Block 88 may be performed continuously, or may be performed periodically.

At block 90, the method includes controlling storage of the received data in memory. For example, the controller 40 may control storage of the data received at block 88 in the memory 58 as stored data 92 (illustrated FIG. 2). Block 90 may be performed continuously (for example, the controller 40 may continuously store a continuous stream of data from the first sensor 46). Alternatively, block 90 may be performed periodically. For example, the controller 40 may buffer continuously received data from the first sensor 46 and then store the received data periodically in the memory 58. By way of another example, the controller 40 may periodically control storage of the received data where the controller 40 periodically receives data from the first sensor 46.

The controller 40 may be configured to store the received data in the memory 58 as a single data file. Alternatively, the controller 40 may be configured to store the received data in the memory 58 as a plurality of data files. For example, the plurality of data files may each be of the order of tens of megabytes in size.

The controller 40 may be configured to time stamp the data when the data is stored in the memory 58 at block 90. Alternatively, dedicated time stamping circuitry may be configured to time stamp the data when the data is stored in the memory 58 at block 90. This means the stored data can be co-ordinated with on-board data like speed signals, which may also comprise a time stamp. The time-stampers may be periodically co-ordinated to handle thermal drift.

At block 94, the method includes determining whether at least one criterion is satisfied. The at least one criterion varies with the relative positioning of the first antenna 66 mounted on a lower housing 14 of the azimuth thruster 10, 101 and the second antenna 68 mounted on the upper housing 12 of the azimuth thruster 10, 101.

To determine whether the at least one criterion is satisfied, the controller 40 may be configured to determine the body spacing and/or whether electrical power is transferred from the second inductor 78 mounted on the upper housing 12 to the first inductor 76 mounted on the lower housing 14 above a threshold electrical power. For example, the controller 40 may monitor the electrical power output by the first inductor 76 to determine whether the transferred electrical power is above the threshold electrical power.

Where the first antenna 66 is positioned adjacent the first inductor 76 and the second antenna 68 is positioned adjacent the second inductor 78, the determination that the electrical power output by the first inductor 76 is above the threshold electrical power is indicative that the first antenna 66 and the second antenna 68 define a distance there between that is within a predetermined distance such that the offset of the bodies is within acceptable tolerance margins. The predetermined distance may be defined as the maximum distance where the radio frequency unit 48 may efficiently transmit a wireless signal to the radio frequency unit 52 so that the radio frequency unit 52 receives the wireless signal with a minimum acceptable signal strength. In further examples, the predetermined distance may be defined by the manufacturer of the azimuth thruster 10, 101. In some examples, the controller 40 may be configured to determine whether electrical power is being transferred from the second inductor 78 to the first inductor 76 at a maximum power level in order to determine whether the first and second bodies 76, 78 fully overlap and thereby satisfy the at least one criterion. Where the electrical power being transferred reaches a maximum, the controller 40 determines that the first and second bodies 76, 78 fully overlap and that the criterion is therefore satisfied.

Additionally or alternatively, the controller 40 may be configured to determine whether an activation signal has been received to determine whether the at least one criterion is satisfied. The activation signal may be indicative of the first antenna 66 and the second antenna 68, and hence first and second bodies 76, 78 defining an offset there between that is within a predetermined distance. Where the determined distance is equal to or less than the predetermined distance, the further controller 50 controls the radio frequency unit 52 (which includes a transmitter or a transceiver in this example) to transmit an activation signal. The radio frequency unit 48 (which includes a receiver or a transceiver in this example) receives the activation signal and provides the activation signal to the controller 40. Where the determined distance is greater than the predetermined distance, the further controller 50 does not control the radio frequency unit 52 to transmit an activation signal, and the method repeats block 94.

At block 96, the method includes controlling transmission of the stored data 92 from the first antenna 66 in response to determining that the at least one criterion is satisfied. For example, the controller 40 may determine that the electrical power transferred from the second inductor 78 to the first inductor 76 is above the threshold electrical power, and in response to that determination, control the radio frequency unit 48 to transmit the stored data 92 from the first antenna 66. By way of another example, the controller 40 may determine that an activation signal has been received and in response to that determination, control the radio frequency unit 48 to transmit the stored data 92 from the first antenna 66.

The method then returns to block 94 so that the controller 40 may determine when to control the radio frequency unit 48 to transmit stored data 92.

The apparatus 24 may be advantageous in that operational condition data of the azimuth thruster 10, 101 may be obtained and stored by the controller 40 in the memory 58 over a period of time. The stored data 92 may then be efficiently transmitted out of the lower housing 14 of the azimuth thruster 10, 101 when the first antenna 66 and the second antenna 68 are positioned relatively close to one another (that is, within a predetermined distance). Alternatively, the apparatus 24 may enable stored data 92 to be continuously transferred to the radio frequency unit 52 for a longer period of time because the radio frequency unit 48 may use less electrical power.

FIG. 8 illustrates a flow diagram of another method for controlling transmission of data according to various examples. At block 110, the method includes determining whether storage capacity of the memory 58 is below a threshold storage capacity. For example, the memory 58 may have a storage capacity of one hundred gigabytes and the threshold storage capacity may be where the memory 58 has ten gigabytes of storage capacity remaining. In this example, the controller 40 is configured to determine whether the storage capacity of the memory 58 is below ten gigabytes.

At block 112, the method includes controlling transmission of the stored data 92 from the first antenna 66 in response to determining that the stored capacity is below the threshold storage capacity. For example, the controller 40 may control the radio frequency unit 48 to transmit all of the stored data 92 to empty the memory 58. By way of another example, the controller 40 may control the radio frequency unit 48 to transmit only a portion of the stored data 92 to partially empty the memory 58.

The controller 40 may control the transmission of the stored data 92 irrespective of the distance between the first and second antennas 66, 68. In other words, the controller 40 may control the transmission of the stored data 92 when the first and second antennas 66, 68 are not in proximity to one another (that is, the first and second antennas 66, 68 define a distance there between that is greater than the predetermined distance) and when the first and second antennas 66, 68 are in proximity to one another (that is, the distance between the first and second antennas 66, 68 is equal to or less than the predetermined distance). Where the controller 40 determines that the first and second antennas 66, 68 are not in proximity to one another, the controller 40 may reduce the power of the wireless signal transmitted by the first antenna 66 to reduce the effect of multipath distortion (by utilising the higher attenuation effect of oil, to reduce the strength of the reflections taking a longer path).

The method illustrated in FIG. 8 is advantageous in that it may prevent the memory 58 from running out of storage capacity and being unable to store data from the first sensor 46. Consequently, the method may improve the integrity of the stored data 92.

FIG. 9 illustrates a flow diagram of a further method for controlling transmission of data according to various examples.

At block 114, the method includes receiving a data request signal. Where the radio frequency unit 48 includes receiver circuitry or a transceiver, the controller 40 may receive a data request signal via the radio frequency unit 48. The data request signal may originate from the Bridge of the vessel 84 where a crew member requests transmission of the stored data 92 from the azimuth thruster 10, 101. The request could also come from the manufacturer, who, having reviewed data from a previous upload and spotted an anomaly, wants all of the up-to date data. In addition, the in thruster unit (that is, the controller 40) could decide that it has spotted an anomaly worthy of immediate data upload and send a subset or all of the data for further analysis by a greater computing and analysis capability in the vessel (e.g. Artificial Intelligence), the ship owner or manufacturer (this could be at an off-board location).

At block 116, the method includes controlling transmission of the stored data from the first antenna 66 in response to receiving the data request signal. For example, the controller 40 may control the radio frequency unit 48 to transmit the stored data 92 in response to determining that the data request signal has been received. It should be appreciated that the controller 40 may control the radio frequency unit 48 to transmit all of the stored data 92, or may control the radio frequency unit 48 to transmit only a portion of the stored data 92 (where the portion of stored data 92 may be selected by the controller 40 using information in the data request signal).

It should be appreciated that in block 116, the controller 40 may control the transmission of the stored data 92 irrespective of the distance between the first and second antennas 66, 68 (that is, when the first and second antennas 66, 68 are not in proximity to one another and when the first and second antennas 66, 68 are in proximity to one another). Where the controller 40 determines that the first and second antennas 66, 68 are not in proximity to one another, the controller 40 may reduce the power of the wireless signal transmitted by the first antenna 66 to reduce the effect of multipath distortion.

The method illustrated in FIG. 9 is advantageous in that it may allow stored data 92 to be transmitted out of the azimuth thruster on demand. This may be useful where the crew of the vessel 84 urgently need to know the operational condition of the azimuth thruster 10, 101.

The system and/or method for using the system could also be applied to the gear box of gas turbine engines, or to transfer power in rotating sections of gears. The system and/or method for using the system could also be applied to data transfer from the rotating part of a power gear box in a gas turbine engine to a static section for Equipment Health Monitoring (EHM) data acquired by vibration or temperature sensors.

Except where mutually exclusive, any of the features may be employed separately or in combination with any other features and the disclosure extends to and includes all combinations and sub-combinations of one or more features described herein.

It will be understood that examples according to the present disclosure are not limited to the embodiments above-described and various modifications and improvements can be made without departing from the concepts described herein. For example, the apparatus 24 may be included within other rotating thruster systems where it is desirable to obtain data from a rotating frame. For example, the apparatus 24 may be implemented within a tunnel thruster or a rudder.

The invention claimed is:

1. An azimuth thruster for a marine vessel, the thruster comprising at least one shaft configured to rotate an underwater propeller and a system for contactless power transmission, the system comprising:
   a first body comprising a plurality of capacitively loaded first inductors forming a tuned LC circuit to provide a magnetic field, the first body being arranged within an upper housing of the thruster;
   a second body comprising a plurality of capacitively loaded second inductors forming a tuned LC circuit to generate an electrical current from the magnetic field, the second body being arranged within a lower housing of the thruster, wherein the plurality of capacitively loaded first inductors and the plurality of capacitively loaded second inductors are concentrically configured at multiple different radial positions within the respective first and second bodies, each capacitively loaded second inductor being located in a matching circumferential and radial location relative to a respective capacitively loaded first inductor, the second body being configured to be rotatable relative to the first body;
   at least one first sensor configured in the lower housing, the at least one first sensor configured to sense at least one operating condition of the thruster;
   a first controller configured to receive first data from the at least one first sensor relating to the least one operating condition of the thruster, and responsive to the received first data, cause transmission of at least a portion of the received first data;
   the one or more first inductors and the one or more second inductors being configured to generate an electrical current from the magnetic field at all relative rotational positions between the first body and the second body regardless of the rotation of the at least one shaft; and
   each of the one or more capacitively loaded first inductors forming a tuned LC circuit being tuned to resonate within a predetermined frequency band and each of the one or more capacitively loaded second inductors forming a tuned LC circuit being tuned to resonate within a predetermined frequency band, the frequency band of each of the one or more second inductors at least partially overlapping with the frequency band of each of the one or more first inductors;

wherein the system is configured for providing power to the at least one first sensor and the first controller.

2. An azimuth thruster as claimed in claim 1, the one or more first inductors and the one or more second inductors configured to overlap by between about 25% to 100% at all relative rotational positions.

3. An azimuth thruster as claimed in claim 1, the one or more first inductors and the one or more second inductors configured to overlap by between about 75% to 100% at all relative rotational positions.

4. An azimuth thruster as claimed in claim 1, the first body comprising two or more first inductors.

5. An azimuth thruster as claimed in claim 1, the second body comprising two or more second inductors.

6. An azimuth thruster as claimed in claim 1, each of the one or more first inductors comprising a resonant transmitter coil.

7. An azimuth thruster as claimed in claim 1, each of the one or more second inductors comprising a resonant receiver coil.

8. An azimuth thruster as claimed in claim 1, each of the one or more first inductors comprising a resonant transmitter coil configured as an annular coil and each of the one or more second inductors comprising a resonant receiver coil configured as an annular coil.

9. An azimuth thruster as claimed in claim 1, each body comprising a conductive material.

10. An azimuth thruster as claimed in claim 1, each body comprising a facing surface comprising one or more of a flat or textured surface.

11. An azimuth thruster as claimed in claim 1, one of first and second bodies being concentrically arranged relative to the other of the first and second bodies.

12. An azimuth thruster as claimed in claim 1, each body comprising a ring.

13. An azimuth thruster as claimed in claim 1, each body being of equal diameter.

14. An azimuth thruster as claimed in claim 1, the bodies being spaced between about 1 mm to 100 mm apart.

15. An azimuth thruster as claimed in claim 1, the bodies being spaced between about 10 mm to 20 mm apart.

16. An azimuth thruster for a marine vessel, the thruster comprising at least one shaft configured to rotate an underwater propeller and a system for contactless power transmission, the system comprising:

a first body comprising a plurality of capacitively loaded first inductors forming a tuned LC circuit to provide a magnetic field, wherein each of the plurality of first inductors is configured as a discrete module, the first body being arranged within a lower housing of the thruster;

a second body comprising a plurality of capacitively loaded second inductors forming a tuned LC circuit to provide a magnetic field to generate an electrical current from the magnetic field, wherein each of the plurality of second inductors is configured as a discrete module, the second body being arranged within a lower housing of the thruster, wherein the plurality of capacitively loaded first inductors and the plurality of capacitively loaded second inductors are concentrically configured at multiple different radial positions within the respective first and second bodies, each capacitively loaded second inductor being located in a matching circumferential and radial location relative to a respective capacitively loaded first inductor, the second body being configured to be rotatable relative to the first body;

at least one first sensor configured in the lower housing, the at least one first sensor configured to sense at least one operating condition of the thruster;

a first controller configured to receive first data from the at least one first sensor relating to the least one operating condition of the thruster, and responsive to the received first data, cause transmission of at least a portion of the received first data;

each of the plurality of first inductors and the plurality of second inductors being configured to generate an electrical current from the magnetic field at all relative rotational positions between the first body and the second body regardless of the rotation of the at least one shaft; and each of the plurality of capacitively loaded first inductors forming a tuned LC circuit being tuned to resonate within a predetermined frequency band and each of the plurality of capacitively loaded second inductors forming a tuned LC circuit being tuned to resonate within a predetermined frequency band, the frequency band of each of the plurality of second inductors at least partially overlapping with the frequency band of each of the plurality of first inductors;

wherein the system is configured for providing power to the at least one.

* * * * *